(12) United States Patent
Chen

(10) Patent No.: US 7,017,526 B2
(45) Date of Patent: Mar. 28, 2006

(54) DEVICE ATTACHED ON BICYCLES FOR WALKING DOGS

(76) Inventor: Cheng-Chuan Chen, P.O. Box 697, Feng-Yuan City, Taichung Hsien, 420 (TW)

( * ) Notice: Subject to any disclaimer, the term of this patent is extended or adjusted under 35 U.S.C. 154(b) by 0 days.

(21) Appl. No.: 10/627,634

(22) Filed: Jul. 28, 2003

(65) Prior Publication Data

US 2005/0034685 A1 Feb. 17, 2005

(51) Int. Cl.
*A01K 15/04* (2006.01)
*A01K 27/00* (2006.01)

(52) U.S. Cl. .................................. 119/771; 280/288.4

(58) Field of Classification Search ............. 119/771; 280/32.7, 288.4, 292
See application file for complete search history.

(56) References Cited

U.S. PATENT DOCUMENTS

| | | | | |
|---|---|---|---|---|
| 4,575,189 | A | * | 3/1986 | Johnson ................. 359/526 |
| 5,632,233 | A | * | 5/1997 | Kovach ................... 119/771 |
| 6,408,793 | B1 | * | 6/2002 | Rutter .................... 119/400 |
| 2002/0121763 | A1 | * | 9/2002 | Kahmann ............... 280/491.1 |
| 2005/0005876 | A1 | * | 1/2005 | Calvi ..................... 119/771 |

* cited by examiner

*Primary Examiner*—Robert P. Swiatek

(57) ABSTRACT

A device attached on bicycles for walking dogs includes a fixed clip, an auxiliary rod, a main rod and a spring, the fixed clip is fixed on a rod of a bicycle, one end of the spring is for a hook of a string to hook on, the fixed clip and the auxiliary rod employ a plurality of screws to connect together, and has a hole, a U-shaped elastic piece is disposed inside the main rod, an elastic ball is disposed on one end of the U-shaped elastic piece, the elastic ball is exposed outside of a hole of the main rod and is inserted inside said hole of the auxiliary rod so that the main road and the auxiliary rod can be connected together, one end of the main rod is in curved shape with a plurality of convex dots on it for said a downwardly pointing spring to sleeve on.

2 Claims, 5 Drawing Sheets

DEVICE ATTACHED ON BICYCLES FOR WALKING DOGS

BACKGROUND OF THE INVENTION

The present invention relates to a device for walking dogs and more particularly to a device attached on bicycle for walking dogs.

Many dog lovers like to walk with their dogs to give them exercise, usually this does not provide enough exercise for dogs and also would make the person very tiring. Other would use a string to attach the dogs to their bicycles, but this would easily cause the bicycles to fall or to control the directions because of the pulling force from the dogs. Therefore, some have designed a spring fixed on the bicycle to maintain a certain distance between the bicycle and the dog, which can also avoid the dog and the string from intervening with the pedals and the wheels. This device can be seen in to U.S. Pat. No. 4,134,364.

Furthermore, another U.S. Pat. No. 4,854,269 employs a spring with a rod attached on both ends, so that a certain distance is formed between the two rods and are perpendicular to each other. The second rod is attached to a belt on the dog, while the first rod is attached on a bicycle. The second rod having a hook attached on the belt of the dog for convenient detachment. The first claim of this patent claims is that:

a) the clip fixed on the bicycle;
b) the first rod provide a distance between the dog and the bicycle;
c) the second rod;
d) employs a spring to connect the two rods;
e) the end of the second rod is attached to the belt of the dog and this provide has a convenient mechanism for easy detachment to avoid accidents.

All these structures provide a distance between the dog and the bicycle and to avoid accidental pulling.

Referring to FIGS. 3 and 4 of the above patent, related to the design of the hook and the belt for easy detachment, the hook cannot provide a safe attachment and can easily be detached accidentally. Referring to FIGS. 1 and 2, the first rod is fixed and attached to the clip and does not provide a convenient and quick detachment mechanism. Even though a turning screw is available, it is not practical and would delay and slow down the detachment process.

SUMMARY OF THE PRESENT INVENTION

The present invention has a main object to provide an easy and convenient detachment device for the hook of the string and the front end of the main rod, for quick and easy detachment of the dog from the bicycle.

Another object is to provide a mechanism with a main rod and a spring for easy and convenient detachment. In comparison with other devices which employ multiple rods, the present invention is much more easily for assembly.

Yet another object is to provide a downward spring instead of a U-shaped upward spring, this can shorten the distance extended outwards to prevent the bicycle from bumping onto obstacles. Furthermore, the spring pointing downward is suitable for the height of dogs and makes the dogs feel comfortable.

The present invention of a device attached on bicycles for walking dogs, is mainly comprised of a fixed clip, an auxiliary rod, a main rod and a spring. The fixed clip is clipped on a certain rod of a bicycle. The end of the spring is for a hook of a string to hook on. The fixed clip and the auxiliary rod employ a few screws to connect together. The auxiliary rod having a hole on it for the main rod to enter into. The main rod has an elastic ball, the elastic ball is exposed outside and can be inserted into the hole of the auxiliary rod. The end of the main rod is in curved shape, with a few convex dots for a downwardly pointing spring to sleeve on. The bottom end of the spring is a rod body, the upper part of the rod is a hook. Accordingly, the elastic ball can be prressed in order to quickly and easily detach the main rod from the auxiliary rod. Since the spring is pointing downward, this provide a firm structure and for easy assembly and easy detachment. The rod pointing downward can shorten the extended distance and suitable for the height of dogs.

The present invention will become more fully understood by reference to the following detailed description thereof when read in conjunction with the attached drawings.

DETAILED DESCRIPTION OF THE PREFERRED EMBODIMENT

Figure 1:
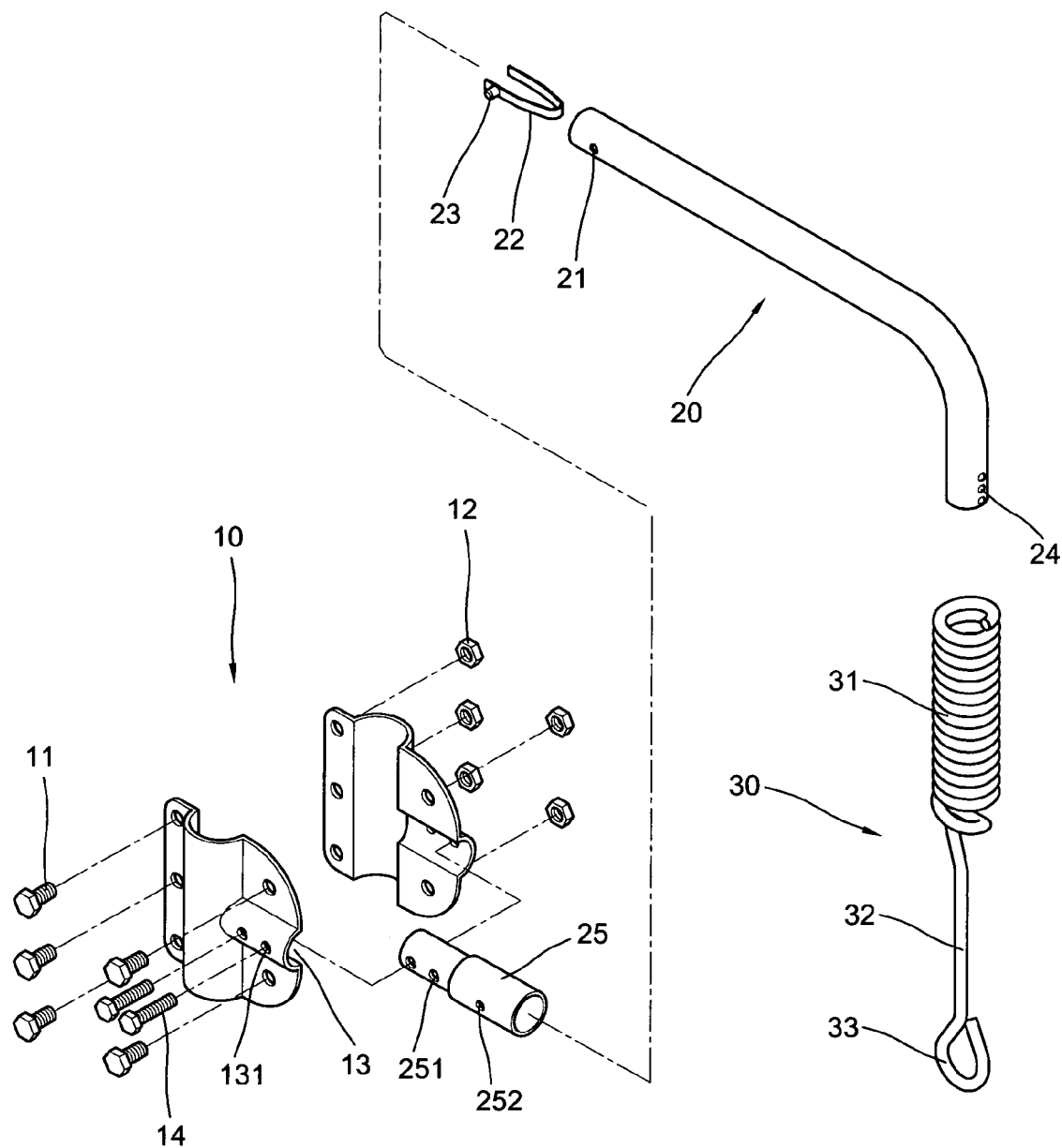
FIG. 1 is an exploded perspective view of the present invention.
Figure 2:
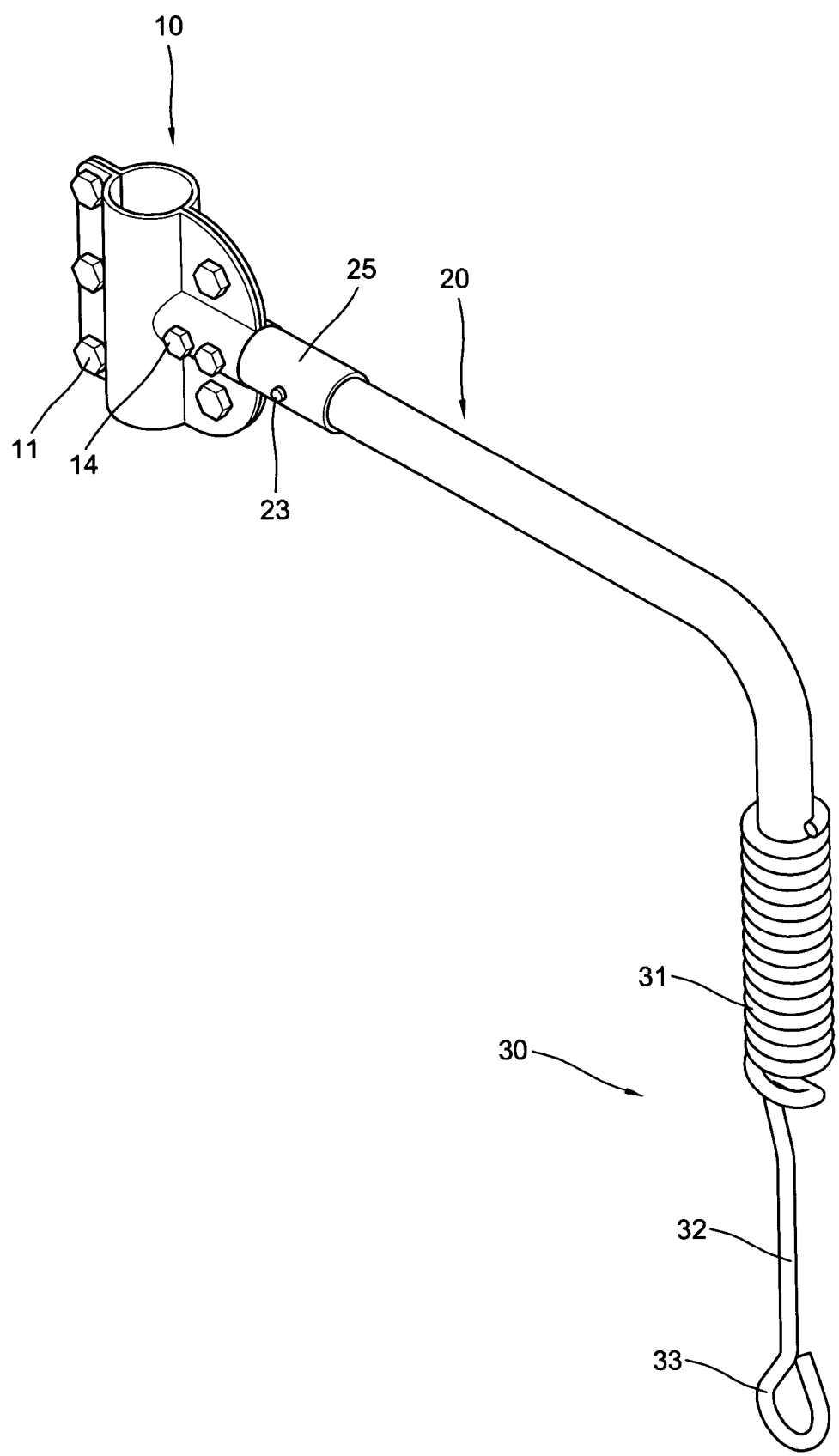
FIG. 2 is a perspective assembly view of the present invention.
Figure 3:
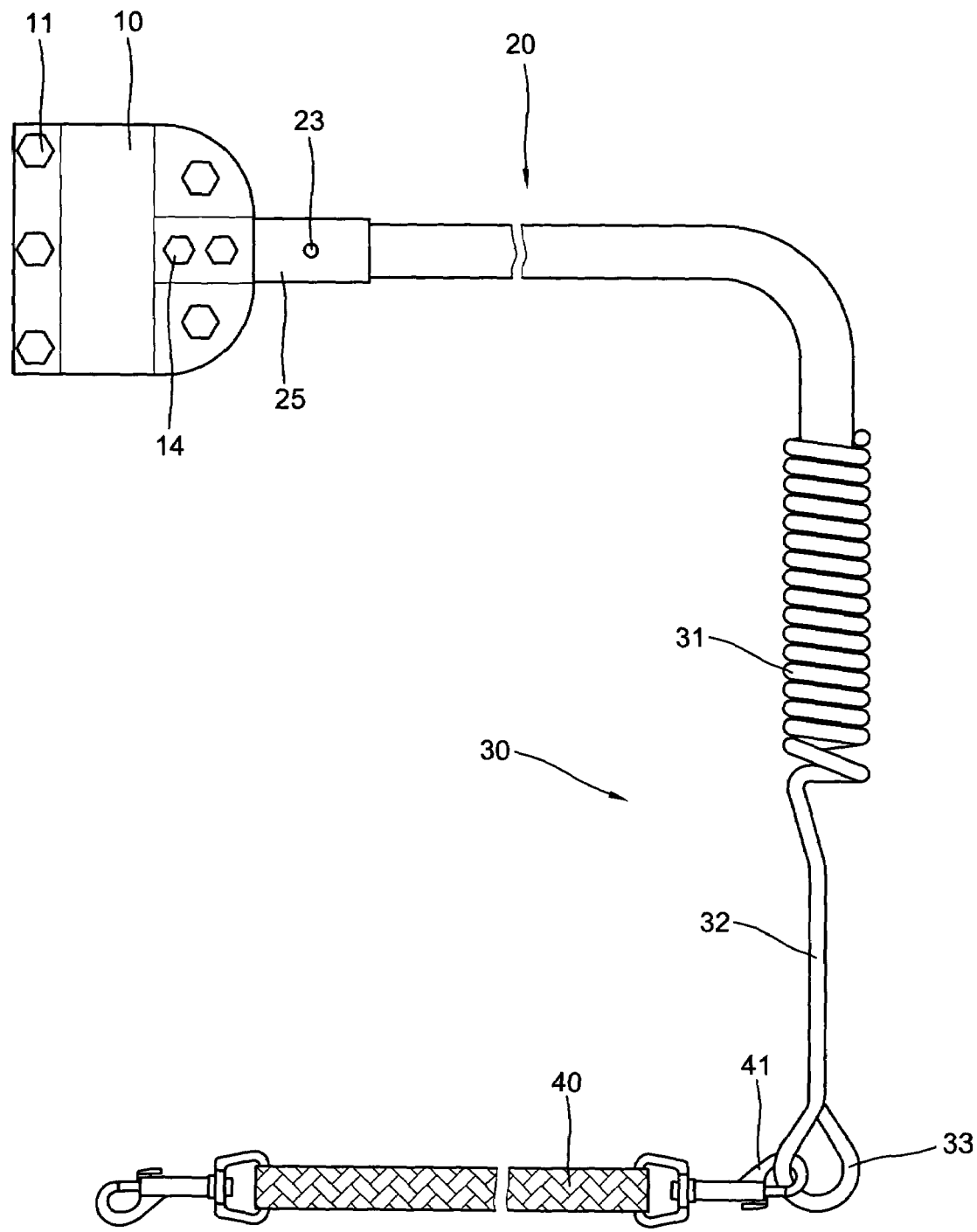
FIG. 3 is a flat assembly view of the present invention.

The present invention is related to a device attached on bicycles for walking dogs, as referring to FIGS. 1, 2 and 3, and mainly comprises a fixed clip 10, an auxiliary rod 25, a main rod 20 and a downwardly pointing spring 30. Firstly, connect the main rod 20 to the spring 30, another end of the main rod 20 is connected to the auxiliary rod 25, and the auxiliary rod 25 is fixed on the fixed clip 10. The fixed clip 10 is formed by a pair of curved pieces, they are fixed on a certain rod near a pad seat of a bicycle by a plurality of screws 11 and nuts 12. The fixed clip 10 has a pair of corresponding semi-spaces 13, the semi-spaces 13 have a plurality of holes 131. A plurality of screw 14 is inserted into the holes 131 and holes 251 of the auxiliary rod 25. The screws 14 together with the auxiliary rod 25 are disposed inside the semi-spaces 13 of the fixed clip 10. The main rod 20 has a hole 21 on one end, a U-shaped elastic piece 22 is inserted into the main rod 20 on the same end where the hole 21 is disposed. One end of the U-shaped elastic piece 22 has an elastic ball 23, the elastic ball 23 is exposed outside the hole 21 of the main rod 20. The elastic ball 23 can also be inserted into a hole 252 of the auxiliary rod 25. The other end of the main rod 20 has a plurality of corresponding convex dots 24, the convex dots 24 are for a spring end 31 of the spring 30 to sleeve on. The other end of the spring 30 is of a rod body 32, the rod body 32 has a hook 33.

Figure 6:
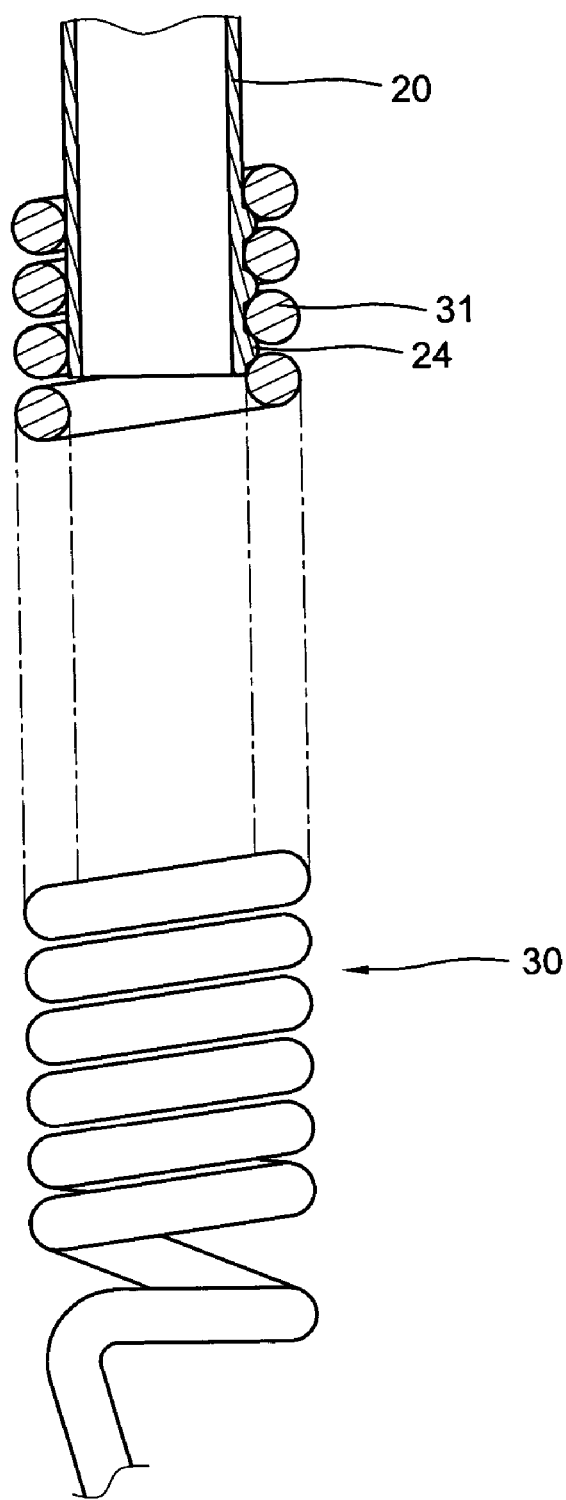
FIG. 6 is a sectional view of the spring connected to the convex dots of the main rod of the present invention.

Accordingly, fix the fixed clip 10 onto a certain rod of a bicycle, then fix the auxiliary rod 25 on the fixed clip 10, once this is done, the auxiliary rod 25 and the fixed clip 10 can be fixed on the bicycle, there is no need to detach or mount again. Connect the main rod 20 with the auxiliary rod 25 by inserting the elastic ball 23 into the hole 252 of the auxiliary rod 25, then sleeve the spring end 31 of the spring 30 on the convex dots 24 of the main rod 20 to finish the assembly process as shown in FIG. 6.

Figure 4:
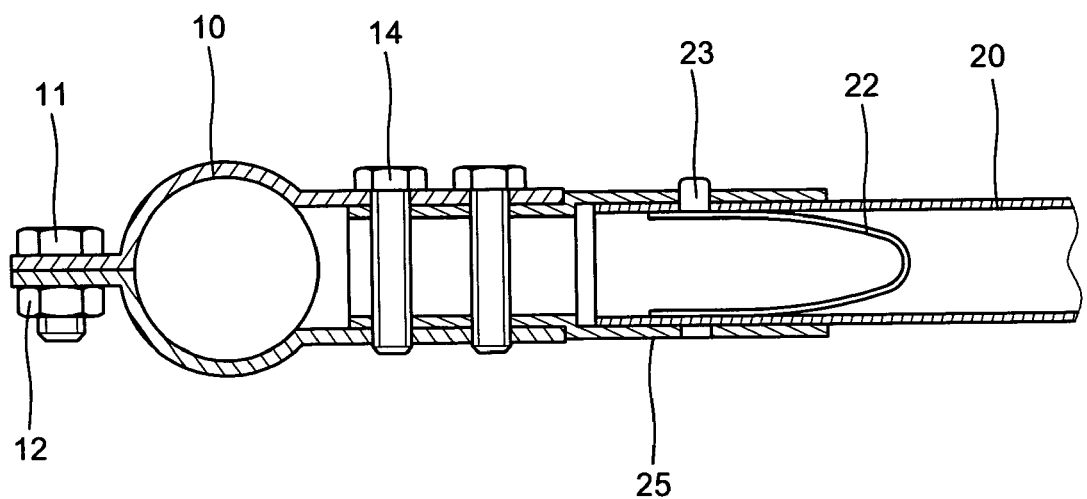
FIG. 4 is a sectional view of the connection of the main and auxiliary rods of the present invention.
Figure 5:
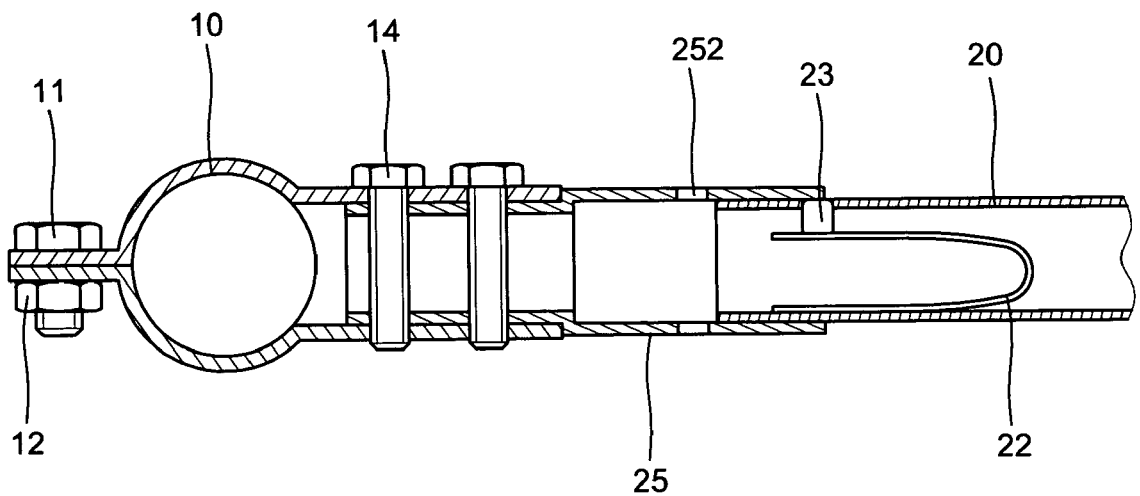
FIG. 5 is a sectional view of the detachment of the main and auxiliary rods of the present invention.

Referring to FIG. 3, hook a hook 41 of a dog belt 40 onto the hook 33 of the spring 30. The hook 41 is an accessory of the belt 40 and can be unhooked anytime. As shown in FIGS. 4 and 5, if the dog owner has to detach the dog quickly in a accident, just simply press the elastic ball 23 to detach the auxiliary rod 25 from the hole 252, so that the main rod 20 is detached from the auxiliary rod 25 easily and quickly. The present invention having the spring 30 pointing downward, the fixed clip 10 fixed on a rod near the pad seat of the bicycle and the main rod 20 extended outward allows the spring 30 to keep a certain distance from the pedals of the bicycles. While the height of the hook 33 of the spring 30 is suitable for the head of the dog, the belt 40 is at level position for comfort of the dog, which is in contrary to the conventional type of device that has the spring pointing upward and the hook resting on the dog head with the belt pulling the dog head upward, which makes the dog uncomfortable. The present invention having the spring 30 pointing downward and connected to the main rod 20, in comparison with the conventional U-shaped spring, it shortens the length extended outward and can avoid bumping into obstacles.

The present invention has one end of the main rod 20 connected with the spring 30, the other end is connected to the auxiliary rod 25 of the fixed clip 10. The main rod 20 is disposed between the spring 30 and the fixed clip 10. This structural mechanism is firm and can be easily assembled and detached. While the conventional type device having the spring disposed between the main rod and the auxiliary rod, the main rod is connected to the fixed clip and is inconvenient to detach.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A device attached on a bicycle for walking dogs comprising:

a fixed clip, an auxiliary rod, a main rod and a spring, said fixed clip is fixed on a rod of a bicycle, one end of said spring is for a hook from a string to hook on, said fixed clip and said auxiliary rod employ a plurality of screws to connect them together, said auxiliary rod has a hole, a U-shaped elastic piece is disposed inside said main rod, an elastic ball is disposed on one end of said U-shaped elastic piece, said elastic ball is exposed outside of a hole of said main rod, said elastic ball is inserted inside said hole of said auxiliary rod so that said main road and said auxiliary can be connected together, one end of said main rod is curved with a plurality of convex dots on it for said spring to sleeve on, a bottom end of said spring is a rod body with a hook, accordingly, the elastic ball can be pressed to detach said auxiliary rod from said main rod and said spring is pointing downwardly, said device features characteristics of firm structure, easy assembly and detachment and it can also shorten the length extended outward and is suitable for the height of the dog.

2. A device as recited in claim 1, said fixed clip having a pair of semi-spaces and a plurality of holes and a plurality of screws are used for screwing into said holes to connect said auxiliary rod and said fixed clip together.

* * * * *